Patented Nov. 30, 1926.

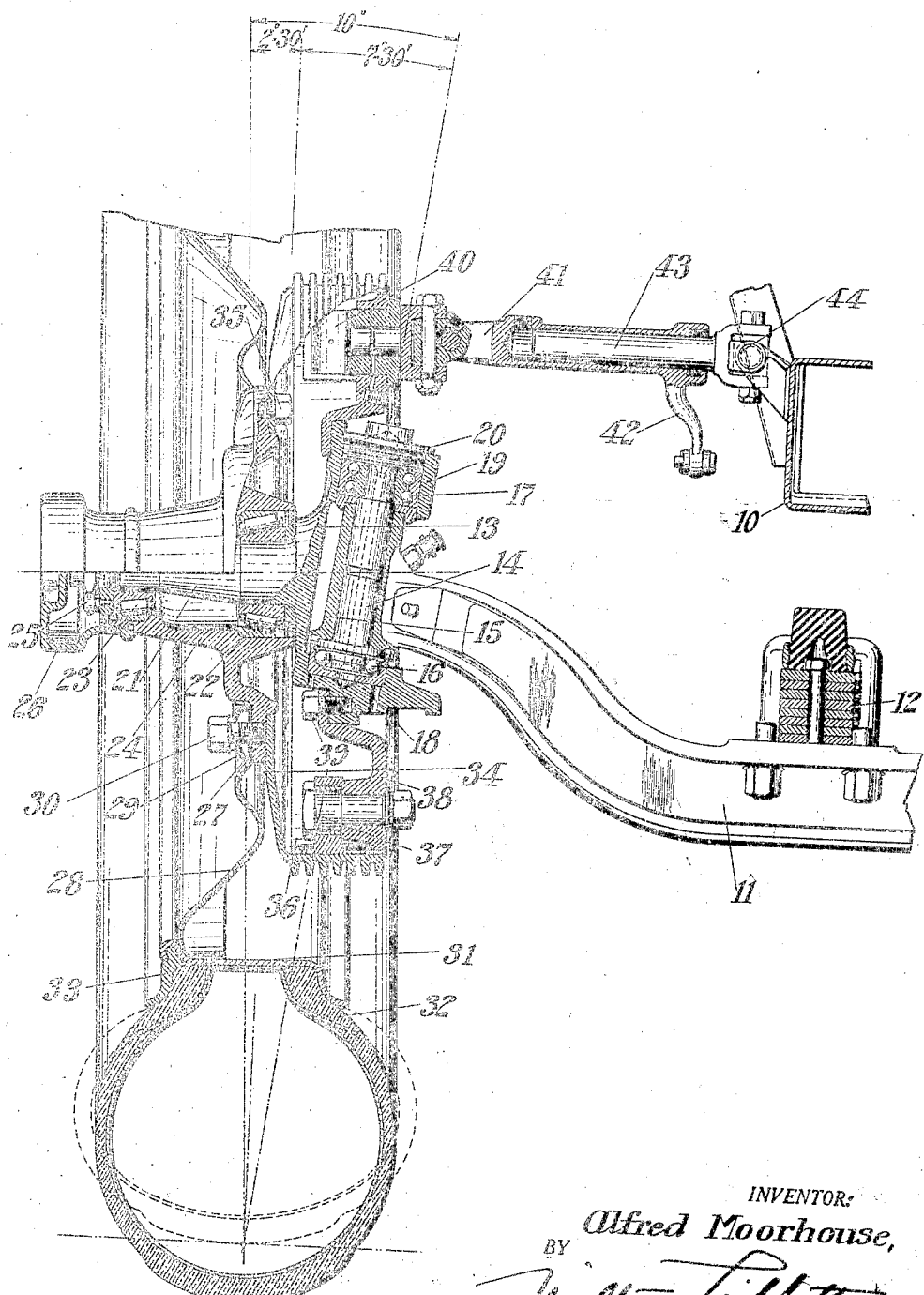

1,608,805

UNITED STATES PATENT OFFICE.

ALFRED MOORHOUSE, OF DETROIT, MICHIGAN, ASSIGNOR TO PACKARD MOTOR CAR COMPANY, OF DETROIT, MICHIGAN, A CORPORATION OF MICHIGAN.

MOTOR VEHICLE.

Application filed April 2, 1923. Serial No. 629,368.

This invention relates to motor vehicles and particularly to the axle and wheel parts thereof.

One of the objects of the present invention is to provide a practical steering knuckle for use with the new large-tire of the flexible side type. These tires are adapted for use with low air pressure, that is, much lower than has heretofore been thought feasible, pressures from fifteen to twenty pounds in six and seven inch tires being used.

One of the problems connected with use of such relatively soft tires is that of obtaining easy steering and it is found that steering knuckles and wheels heretofore employed are not suitable for the purpose.

Another object of the invention is to provide a practical wheel and brake construction in connection with soft flexible side tires such as referred to above.

Another object of the present invention is to provide a steering knuckle with its pivot and its spindle so inclined that easy steering may be obtained with the use of soft tires of the flexible side type referred to above.

Other, and perhaps as important, objects will appear from the following description taken in connection with the drawing, which forms a part of this specification, in which the figure is a vertical sectional view, with some parts in elevation, of a motor vehicle made in accordance with this invention.

Referring to the drawing, 10 is a motor vehicle frame, shown only in section in the drawing, and 11 is an axle, shown as the steering or front axle of the vehicle. A spring 12 is shown in section as secured to the axle and it will be understood that this spring has its ends suitably connected to the frame for supporting the latter. As both ends of the axle are the same only one end is illustrated and will be described.

A steering spindle 13 is mounted at the end of the axle and for the purpose of reducing friction the spindle is pivoted on ball bearings. A pivot pin 14 is shown as extending through the enlarged end 15 of the axle and a thrust bearing 16 is provided at one end of the pivot pin and an annular bearing comprising two rows of balls is indicated at 17 at the other end of the pin. The steering knuckle extends both above and below the pivot pin 14 and the bearings 16 and 17 are seated in the parts 18 and 19 of the steering knuckle. A suitable cap 20 is threaded in the upper part of the steering knuckle to retain the bearings and the pivot pin in place.

The steering knuckle 13 is formed with a spindle 21, which has two separated bearings 22 and 23 thereon, the bearing 22 being arranged at the base of the spindle and the bearing 23 at the outer end thereof. A wheel hub 24 is mounted on the bearings 22 and 23 to rotate about the spindle 21 and a nut 25 retains the bearings and wheel in place. A hub cap 26 covers the nut and the end of the spindle. It will be seen that the axis of the knuckle pivot is somewhat inclined to the vertical and the spindle 21 is also slightly inclined from the horizontal so that the wheel does not revolve in a truly vertical plane. The degree of inclination of the axes of these parts will be hereinafter more particularly referred to. It is to be noted, however, that neither inclination is very great and that the construction is such that the wheel hub and the bearing 22 are brought very close to the axis of the knuckle pivot 14.

The wheel hub 24 is formed with an annular flange 27 which extends radially from the hub and the outer part of which is in a plane substantially in the middle of the inner bearing 22. This sets the hub flange well in towards the base of the knuckle spindle and gets it close to the knuckle pivot.

Detachably connected to the flange 27 of the wheel hub is a disk wheel 28, a ring 29 and a series of bolts 30 being shown as the clamping means. The outer circumference of the wheel 28 is in the form of a rim 31 and a tire 32 is mounted on the rim as by the usual demountable split ring 33. The rim and tire are positioned substantially in line with the flange 27 of the wheel hub so that the plane of the middle of the tire tread is approximately in the plane of said flange 27. This brings the tread of the tire well in under the inner bearing 22 on the spindle so that the greater portion of the load is borne by this bearing and the outer bearing 23 acts as a steady bearing.

The tire 32 is of the new flexible side type which is adapted for low air pressure. The tire shown is a reduction from a tire approximately 7″ x 34″ and it is designed to carry about twenty pounds air pressure. This low pressure is possible by reason of the construction of the tire casing and the tire when under normal load is considerably deformed or flattened and takes substantially the position shown in dotted lines in the drawing. In full lines the tire is shown as inflated and non-compressed.

Also mounted upon the flange 27 of the wheel hub 24 is a brake drum 34, the attaching bolts being particularly illustrated in the upper part of the view at 35. This brake drum sets will within the rim of the wheel or in other words the rim overhangs the brake drum as is evident from an inspection of the drawing. Brakes 36 are pivotally mounted as at 37 on a support 38, which support is mounted upon the enlarged part of the steering knuckle and it is connected thereto by a series of bolts 39. This support closes the inner opening of the brake drum. At its upper part the brake operating mechanism is mounted. This is shown in the form of a cam 40, which may be mounted between the free ends of the brake shoes, and a universally operating shaft 41 and an arm 42 are connected to the cam. One end of the shaft 41 is mounted on a spindle 43 with which it telescopes and a universal joint 44 supports the spindle 43 on the frame 10 of the vehicle. Suitable connections extend from the arm 42 to the brake lever on the vehicle.

These universal joints and the telescope connection permit of the operation of the brakes regardless of the position of the steering knuckle. The steering knuckle may, of course, be turned on its pivot 14 by any suitable mechanism connected with the steering wheel of the vehicle, this mechanism and steering wheel not being shown.

It will be seen that by reason of the use of a disk wheel the tread of the tire is brought close in to the base of the spindle of the steering knuckle and almost under the steering pivot, without at the same time having either of the wheel bearings surround the steering pivot, as in some prior constructions. This bringing in of the wheel towards the steering pivot makes easy steering possible without complicating the knuckle construction and easy steering with a soft tire such as the tire above referred to is most desirable.

The turning movement of the tire on the ground is most readily brought about if the downwardly extending axis of the steering knuckle pivot meets the ground substantially in the middle of the portion of the tire tread that is in contact with the ground. With the flexible side type of tire above referred to this point is different being nearer the axis of the wheel than in tires heretofore used and as shown the downwardly extending axis of the knuckle pivot is so inclined relative to the plane of the wheel that it meets the ground substantially in the plane of the middle of the tire tread. And yet the axis of the knuckle pivot is only about ten degrees removed from the plane of the middle of the wheel because of the close-in construction of the wheel and associated parts.

While I have herein described in some detail a specific embodiment of my invention, which I deem to be new and advantageous and may specifically claim, I do not desire it to be understood that my invention is limited to the exact details of the construction, as it will be apparent that changes may be made therein without departing from the spirit or scope of my invention.

Having thus described my invention, what I claim and desire to secure by Letters Patent is:

In a motor vehicle, the combination of an axle, a steering knuckle pivoted thereon at a slight angle to the vertical and having a spindle arranged slightly inclined from the horizontal, a wheel hub mounted to rotate on said spindle, a disk wheel mounted on said hub and so formed that the middle of its tread is in a plane adjacent the inner end of said spindle, a tire of the flexible side type mounted on said wheel, a brake drum for said wheel set well within the rim thereof so that the entire drum is within the tire, a brake mounted within said drum, and means for operating said brake.

In testimony whereof I affix my signature.

ALFRED MOORHOUSE.